(12) United States Patent (10) Patent No.: US 7,593,115 B2
Hernandez-Solis et al. (45) Date of Patent: Sep. 22, 2009

(54) DETERMINING A LENGTH OF A CARRIER LINE DEPLOYED INTO A WELL BASED ON AN OPTICAL SIGNAL

(75) Inventors: Vladimir Hernandez-Solis, Stafford, TX (US); Rogerio T. Ramos, Hampshire (GB); Joseph Varkey, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 182 days.

(21) Appl. No.: 11/680,271

(22) Filed: Feb. 28, 2007

(65) Prior Publication Data

US 2008/0204703 A1 Aug. 28, 2008

(51) Int. Cl.
G01B 11/30 (2006.01)
(52) U.S. Cl. ....................... 356/600; 356/634
(58) Field of Classification Search ................. 356/600, 356/634; 166/64, 66, 77.1; 73/158; 324/206, 324/332, 333, 336, 338; 340/825.23; 175/40, 175/45; 250/256, 261–269.2, 259; 173/81, 173/147, 151; 254/270, 276
See application file for complete search history.

(56) References Cited

U.S. PATENT DOCUMENTS

| 2,782,515 | A | | 2/1957 | Mayes |
|---|---|---|---|---|
| 3,490,149 | A | | 1/1970 | Bowers |
| 3,497,958 | A | | 3/1970 | Gollwitzer |
| 4,179,817 | A | | 12/1979 | Lavigne |
| 4,282,523 | A | | 8/1981 | Youmans |
| 4,545,017 | A | | 10/1985 | Richardson |
| 4,597,183 | A | * | 7/1986 | Broding ...................... 33/701 |
| 4,718,168 | A | | 1/1988 | Kerr |
| 4,791,618 | A | | 12/1988 | Pruchnik |
| 4,852,263 | A | | 8/1989 | Kerr |
| 5,062,048 | A | | 10/1991 | Coulter |
| 5,469,916 | A | | 11/1995 | Sas-Jaworsky |
| 6,563,303 | B1 | * | 5/2003 | Watkins ...................... 324/206 |
| 6,843,318 | B2 | | 1/2005 | Yarbro |
| 2004/0140421 | A1 | * | 7/2004 | Dammann ............. 250/227.14 |
| 2007/0131418 | A1 | * | 6/2007 | Barrow et al. ............ 166/255.1 |

FOREIGN PATENT DOCUMENTS

| GB | 2329722 A | 3/1999 |
|---|---|---|
| JP | 04043935 A | 2/1992 |
| WO | 8805112 | 7/1988 |

* cited by examiner

Primary Examiner—Gregory J Toatley, Jr.
Assistant Examiner—Tri T Ton
(74) Attorney, Agent, or Firm—Rodney Warfford; David Cate; Jaime Castano

(57) ABSTRACT

A component is deployed into a well on a carrier line having an optical cable. An optical signal is transmitted into the optical cable, and a travel time of the optical signal in the optical cable is determined. A profile of a characteristic along the optical cable is determined, and a length of the carrier line deployed into the well is determined based on the determined profile and the travel time.

23 Claims, 3 Drawing Sheets

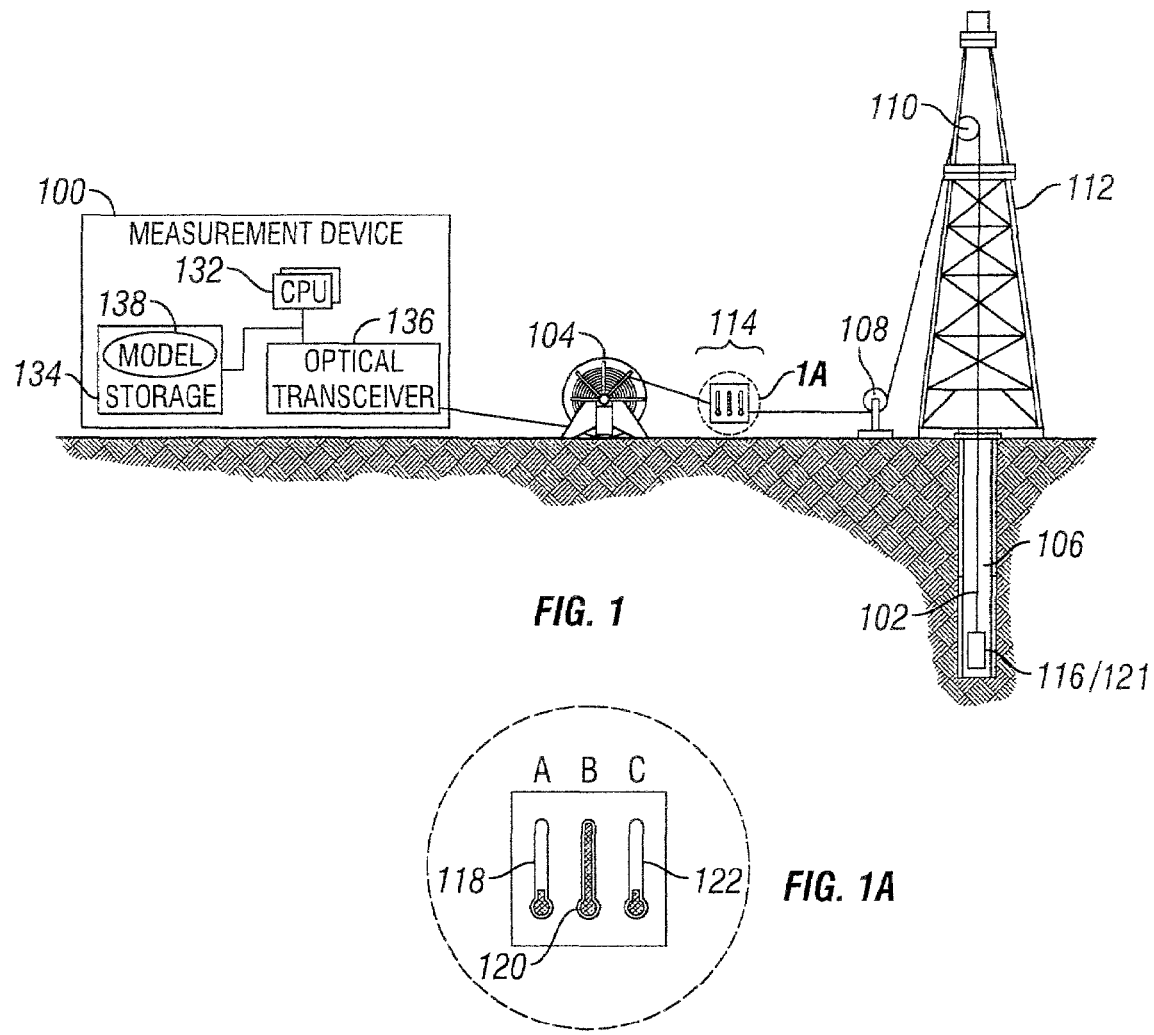
FIG. 1
FIG. 1A
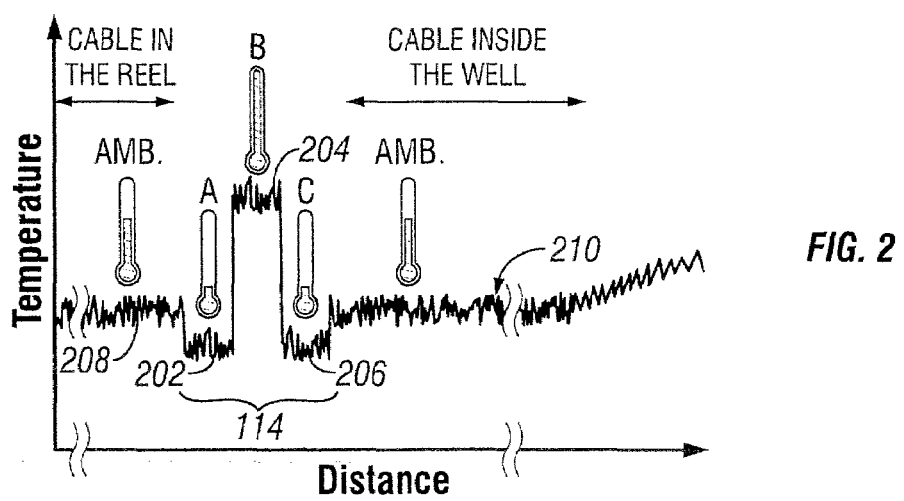
FIG. 2

DETERMINING A LENGTH OF A CARRIER LINE DEPLOYED INTO A WELL BASED ON AN OPTICAL SIGNAL

TECHNICAL FIELD

The invention relates to determining a length of a carrier line deployed into a well using an optical time domain reflectometry technique, such as a Brillouin optical time domain reflectometry technique.

BACKGROUND

It is often desirable to determine the depth of a downhole component, such as a tool carried on a carrier line (e.g. wireline or slickline cable) that has been deployed into a well. Typically, the carrier line is wound on a spool or reel at an earth surface location. To deploy a tool on the carrier line into the well, the carrier line is unwound from the spool.

Conventionally, a depth wheel sensor is provided at the earth surface location proximate the spool to determine an amount of carrier line that has been unwound from the spool. The depth wheel sensor includes a wheel or roller that is rotated as the carrier line is unwound from the spool. The number of rotations of the wheel is used to determine the length of the carrier line that has been unwound from the spool and lowered into a well.

This technique for measuring the length of carrier line that has been deployed into a well is not very accurate. As a carrier line is deployed into the well, the carrier line length will change due to environmental conditions (e.g., changes in temperature and/or pressure) and due to strain applied by the weight of the carrier line as well as the tool carried on a carrier line. The depth wheel sensor for measuring the length of carrier line that has been deployed into the well does not account for such length changes.

SUMMARY

In general, according to an embodiment, a method comprises deploying a component into a well on a carrier line having an optical cable, and transmitting an optical signal into the optical cable. A travel time of the optical signal in the optical cable is determined. Also, a profile of a characteristic (e.g., temperature profile and/or strain profile) along the optical cable is determined. A length of the carrier line deployed into the well is determined based on the determined profile and the travel time.

Other or alternative features will become apparent from the following description, from the drawings, and from the claims.

BRIEF DESCRIPTION OF THE DRAWINGS

FIG. 1 illustrates a first exemplary arrangement that includes a measurement device according to an embodiment. FIG. 1A shows an enlarged view of the embodiment of the marker shown in FIG. 1.

FIG. 2 is a graph that illustrates a reference marker implemented with temperature changes on an optical cable of a carrier line that is deployed into a well.

DETAILED DESCRIPTION

Figure 3:
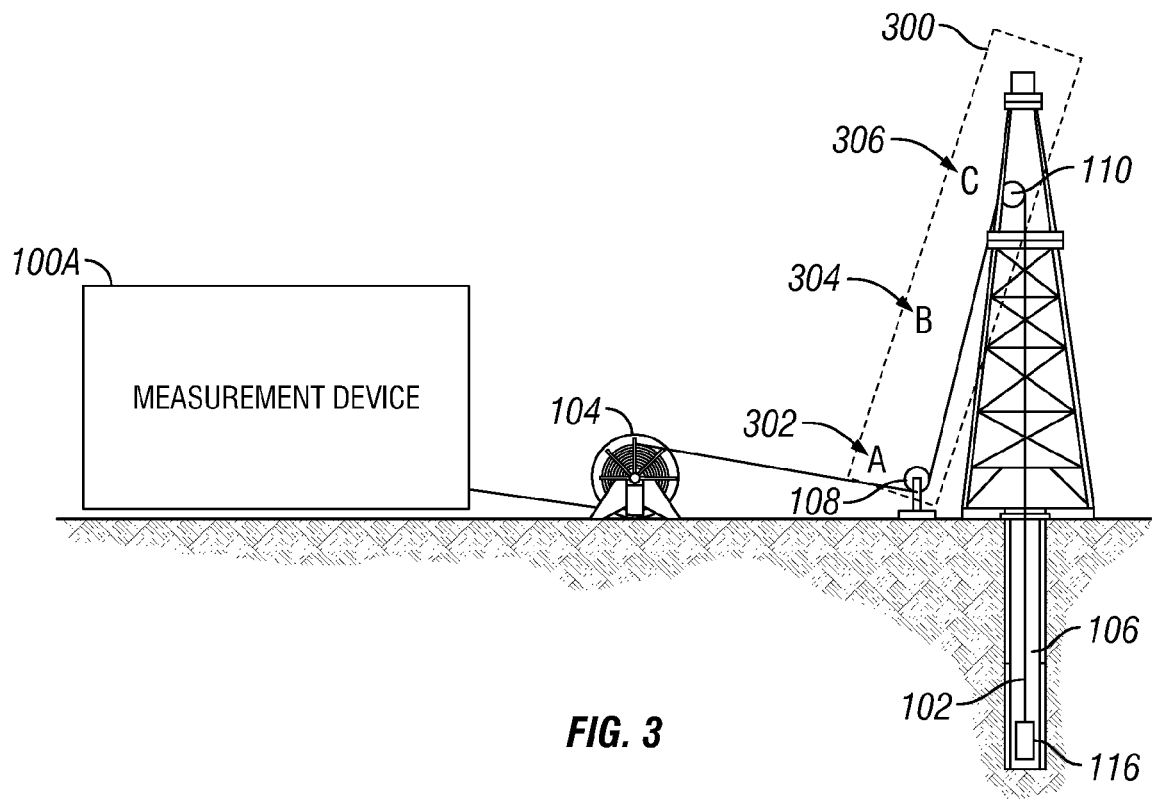
FIG. 3 illustrates a second exemplary arrangement that includes a measurement device according to another embodiment.

In the following description, numerous details are set forth to provide an understanding of the present invention. However, it will be understood by those skilled in the art that the present invention may be practiced without these details and that numerous variations or modifications from the described embodiments are possible.

In accordance with an embodiment, an optical time domain reflectometry (OTDR) technique is used to determine a length of a carrier line deployed into a well. More specifically, the OTDR technique is based on optical signal scattering. There are three primary types of optical signal scattering: Rayleigh, Raman and Brillouin. Although each of the three mentioned optical signal scattering types could be used to advantage in the present invention, for purposes of illustration, and not limitation, the below discussion focuses primarily on the Brillouin scattering.

According to an embodiment, the OTDR technique used is a Brillouin OTDR technique, which involves measurements based on Brillouin scattering. In an optical cable (also referred to as an optical fiber), Brillouin scattering is an inelastic phenomenon that results from the interaction of incident optical photons (of an incident optical signal) with acoustic phonons in the medium (the optical fiber). This interaction induces a counter-propagating optical wave (back-scattered optical signal) having a frequency (Brillouin frequency) that is shifted from the frequency of the original incident optical wave. Brillouin scattering in an optical fiber is sensitive to both temperature and strain changes in the optical fiber. The Brillouin frequency shift resulting from temperature and strain changes are linear in nature and are typically well characterized.

A Brillouin optical time domain reflectometry (B-OTDR) measurement device measures a Brillouin frequency shift and correlates the frequency shift to temperature and/or strain changes along an optical fiber (such as a single-mode optical fiber). The measurement is distributed along the length of the optical fiber, which provides a temperature and/or strain profile. Moreover, a relatively big reflection occurs from the distal end of the optical fiber, which provides a marker (downhole marker) that allows for accurate fiber length reading. In addition, another marker is provided at an earth surface location (e.g., near the top of the well). The overall travel time of the optical signal in the optical fiber is measured, where the overall travel time is the sum of a first travel time of the incident optical signal from the earth surface marker to the downhole marker, and a second travel time of the back-scattered optical signal from the downhole marker to the earth surface marker. The travel time between the two markers (one at the earth surface and one at a downhole location, such as at the distal end of the optical fiber), in conjunction with the determined temperature and/or strain profile along the length of the optical fiber, are used to provide accurate carrier line length and well-depth measurements.

The temperature profile and strain profile along the optical fiber affects the refractive index of the optical fiber. A change in the refractive index causes the velocity of light in the optical fiber to change. Consequently, determining the length of the optical fiber in the well based on just travel time of the optical signal does not take into account the change in the refractive index of the optical fiber due to fluctuations in temperature and strain of the optical fiber. By determining the temperature profile and strain profile along the length of the optical fiber that is in the well, adjustments can be made to more accurately determine the actual length of the optical fiber that has been deployed into the well.

The earth surface marker is provided in the optical fiber at an earth surface location between a spool that carries the optical fiber and the wellhead at the top of the well. The earth surface marker can be provided in the optical fiber using one of various techniques. One technique is to apply temperature change to a particular point (or series of points) at a location on the optical fiber. Another technique is to use strain marking, where different strains are applied to a series of points at a particular location of the optical fiber.

FIG. 1 shows an exemplary arrangement that includes a measurement device 100 that is coupled to an optical fiber 102 carried on a spool 104. Note that the optical fiber 102 can be part of a carrier line, such as a tubing, wireline, slickline, and so forth. The optical fiber 102 is unwound from the spool 104 to deploy the optical fiber 102 into a well 106. In the exemplary arrangement of FIG. 1, the optical fiber 102 is provided through reels 108 and 110 (that are part of wellhead equipment 112) prior to deployment into the well 106. The optical fiber 102 at its distal end is coupled to a tool 121 that has been lowered into the well 106.

As depicted in FIG. 1, a first marker 114 is provided at an earth surface location between the spool 104 and the wellhead equipment 112. A second marker 116 is provided on the optical fiber 102 at a downhole location, such as at the distal end of the optical fiber 102. In accordance of some embodiments, the first marker 114 includes a series of points 118, 120, and 122 that are set at temperatures different from the ambient temperature of the optical fiber portions proximal the first marker 114. For example, in the embodiment depicted in FIG. 1, point 118 is at a relatively low temperature (a cooled temperature), point 120 is at a relatively high temperature (a heated temperature), and point 122 is at a relatively low temperature (a cooled temperature). Heating is performed by a heater (not shown), whereas cooling is performed by a cooling device (not shown). Since the different temperature points 118, 120, and 122 are set at temperatures different from the ambient temperature of the adjacent optical fiber portions, a measured temperature profile along the length of the optical fiber 102 will indicate presence of the first marker 114.

In accordance with some embodiments, the length of the cable 102 determined to be deployed into the well 106 is based on the length of the cable defined between the first and second markers 114, 116. Note that the optical fiber length between the first marker 114 and the entry point into the well 106 is known so that the depth of the tool 121 in the well 106 can be derived.

In accordance with an embodiment, the measurement device 100 is a Brillouin optical time domain reflectometry (B-OTDR) measurement device, which relies upon Brillouin scattering to determine the temperature and strain profiles along the optical fiber 102. As depicted in FIG. 1, the measurement device 100 includes software 130 executable on one or more central processing units (CPUs) 132. The CPU(s) 132 is connected to a storage 134. The CPU(s) 132 is (are) coupled to an optical transceiver 136. The software 130 executable on the CPU(s) 132 causes the optical transceiver 136 to transmit an incident optical signal into the optical fiber 102. A back-scattered optical signal is also received by the optical transceiver 136, where the back-scattered optical signal has its Brillouin frequency shifted from the frequency of the incident optical signal. Based on the back-scattered optical signal received by the optical transceiver 136, the software 130 is able to determine the two-way travel time of the incident optical signal and the back-scattered optical signal. The software 130 is also able to determine the temperature profile and strain profile along the length of the optical fiber 102 based on the back-scattered optical signal. More specifically, the measurement device 100 is able to measure fluctuations in Brillouin scattering on optical fibers, which Brillouin scattering is affected by changes in temperature and strain. The identifiable changes in optical wave patterns are recorded by the measurement device 100 to develop the temperature and strain profiles.

A model 138 is stored in the storage 134, where the model 138 maps travel time, temperature profile, and strain profile to a length of the optical fiber. The model 138 is developed based on characterization of the particular optical fiber 102 that is actually used at the wellsite. The characterization can be performed at a tool assembly location, the wellsite, or by a manufacturer of the optical fiber. Characterizing the optical fiber involves subjecting the optical fiber to different known temperature and/or strain variations to determine the temperature and/or strain profiles of the optical fiber and the effect on the length of the optical fiber.

The software 130 is able to apply the following measured parameters to the model 138: travel time, temperature profile, and strain profile. Based on the measured input parameters, the model 138 produces an output that is indicative of the length of the optical fiber 102 in the well.

FIG. 2 is a graph that illustrates a temperature profile along a portion of the optical fiber. The graph plots temperature relative to distance along the length of the optical fiber 102. The first marker 114 is represented by a series of temperature changes, which in FIG. 2 includes a cooled temperature 202, a heated temperature 204, and a cooled temperature 206. The temperature of the optical fiber segment that is carried on the spool 104 is at an ambient temperature represented as 208, and the temperature of the optical fiber 102 in the well is represented by a temperature profile 210. Note that the temperature profile 210 indicates that temperature increases with increasing depth in the well 106.

FIG. 3 shows a different arrangement that includes a measurement device 100A that is coupled to the optical fiber 102 carried on the spool 104. The measurement device 100A also includes software, CPU(s), and storage similar to those in the measurement device 100 of FIG. 1. In the FIG. 3 arrangement, the first marker 114 (FIG. 1) that is based on temperature changes at different points is omitted. Instead, the first marker in the FIG. 3 arrangement is indicated as 300, which includes a series of points 302, 304, and 306 having different strains. The difference in strain at the first point 302 is caused by the reel 108, the strain difference at point 304 is caused by the absence of a reel, and the change in strain at point 306 is caused by presence of reel 110.

Figure 4:
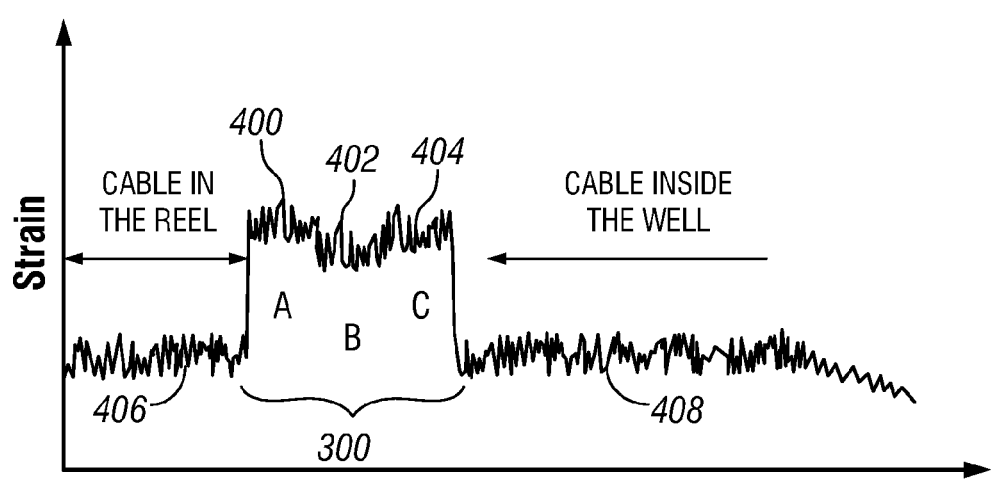
FIG. 4 is a graph that illustrates a reference marker implemented with strain changes on an optical cable in a carrier line deployed into a well.

The strain profile is depicted in FIG. 4, which plots strain with distance along the length of the optical fiber. The first marker 300 is represented by the three points of increased strain, including increased strain 400 at point A (302), increased strain 402 at point B (304, where the strain at point B is less than the strain at point A but greater than the ambient strain of the optical fiber outside the region of the first marker 300), and increased strain 404 at point C (306). The ambient strain in the optical fiber segment on the spool 104 is represented as 406. The strain of the optical fiber segment in the well is represented as 408, where the strain decreases with depth of the optical fiber.

Figure 5:
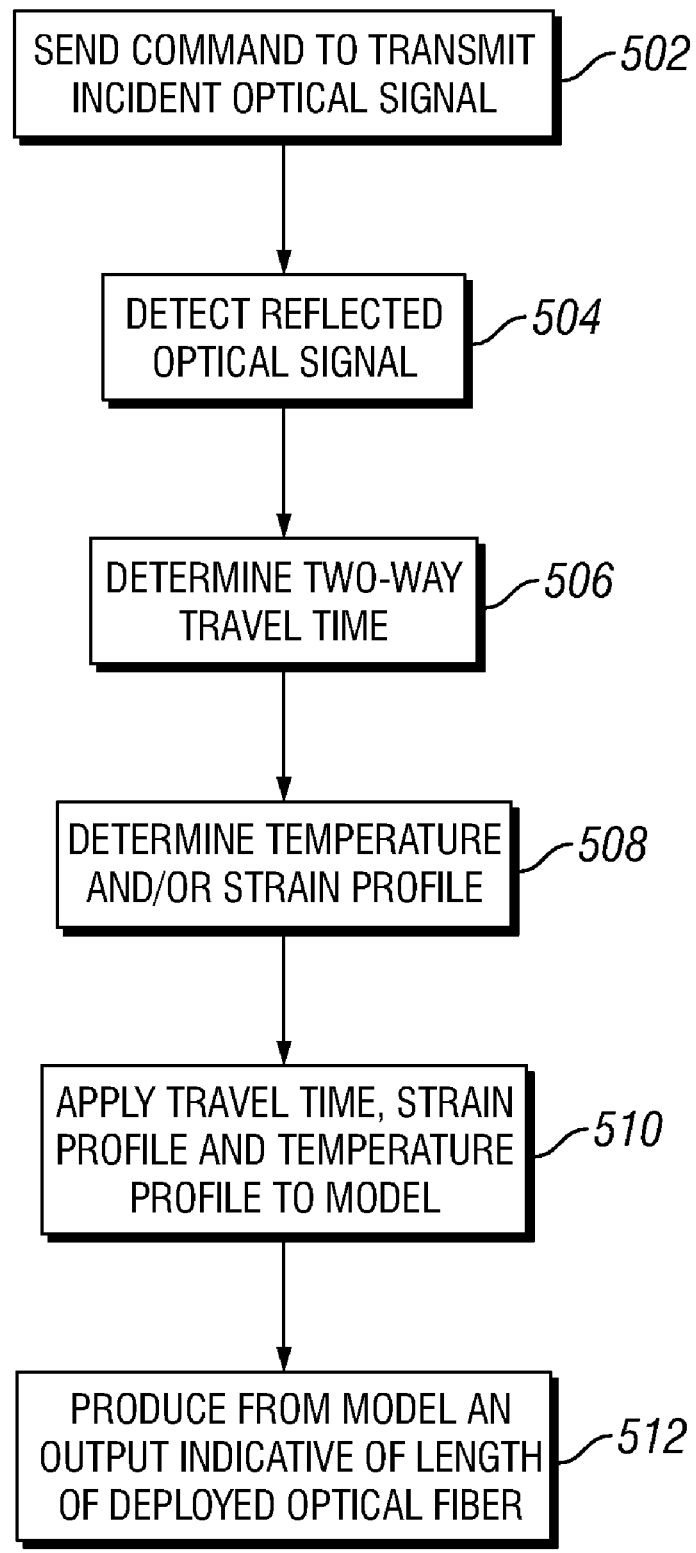
FIG. 5 is a flow diagram of a process performed by the measurement device according to an embodiment.

FIG. 5 is a flow diagram of a process performed by the software 130 in the measurement device 100 or 100A, in accordance with an embodiment. The software 130 sends (at 502) a command to transmit an incident optical signal into the optical fiber. The software 130 then detects receipt of the back-scattered optical signal (at 504). Based on the timings associated with the incident optical signal and the back-scattered optical signal, the software 130 determines (at 506) the two-way travel time to a distributed series of points along the fiber. Based on the back-scattered optical signal, the software 130 also determines (at 508) the strain profile and the temperature profile. The two-way travel time, strain profile, and the temperature profile are applied (at 510) to the model 138 in the measurement device, which model 138 then produces an output that indicates a length of the optical fiber between the first and second markers (at 512).

Instructions of software described above (including software 130 of FIG. 1) are loaded for execution on a processor (such as one or more CPU(s) 132 in FIG. 1). The processor includes microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

We claim:

1. A method comprising:
   deploying a component into a well on a carrier line having an optical cable;
   transmitting an optical signal into the optical cable;
   determining a travel time of the optical signal in the optical cable,
   wherein the transmitted optical signal comprises an incident optical signal;
   detecting a back-scattered optical signal in the optical cable back scattered from a downhole marker in the optical cable in response to the incident optical signal;
   determining a profile of a characteristic of the optical cable along the optical cable; and
   determining a length of the carrier line deployed into the well based on the determined profile and the travel time, wherein determining the travel time is based on summing a travel time of the incident optical signal and a travel time of the back-scattered optical signal.

2. The method of claim 1, wherein determining the profile is based on an optical time domain reflectometry technique.

3. The method of claim 1, wherein determining the profile is based on a Brillouin optical time domain reflectometry technique.

4. The method of claim 1, wherein determining the profile is based on a Rayleigh optical time domain reflectometry technique.

5. The method of claim 1, wherein determining the profile is based on a Raman optical time domain reflectometry technique.

6. The method of claim 1, wherein determining the profile of the characteristic of the optical cable comprises determining at least one of a temperature profile and a strain profile.

7. The method of claim 1, wherein determining the profile of the characteristic comprises determining a temperature profile along a length of the optical cable.

8. The method of claim 7, further comprising:
   applying the temperature profile and the travel time to a model; and
   producing, by the model, a length of the carrier line based on the travel time and temperature profile.

9. The method of claim 8, further comprising:
   determining a strain profile along the optical cable; and
   applying the strain profile to the model along with the temperature profile and travel time,
   wherein producing the length of the carrier line by the model is further based on the strain profile.

10. The method of claim 1, further comprising:
    providing a first marker in the optical cable at an earth surface location, and a second marker in the optical cable at a downhole location,
    wherein determining the travel time is based on travel time of the incident optical signal and the back-scattered optical signal between the first and second markers.

11. The method of claim 10, wherein providing the first marker comprises providing a marker that includes at least one point on the optical cable having a temperature different from an ambient temperature of portions of the optical cable proximal the first marker.

12. The method of claim 11, wherein providing the at least one point having the different temperature comprises providing plural points having temperatures different from the ambient temperature.

13. The method of claim 10, wherein providing the first marker comprises providing at least one point on the optical cable having a strain different from an ambient strain of portions of the optical cable proximal the first marker.

14. The method of claim 13, wherein providing the at least one point having the different strain comprises providing plural points having strains different from the ambient strain.

15. The method of claim 14, wherein providing the plural points having different strains comprises providing the plural points having different strains using plural reels through which the optical cable passes.

16. A system comprising:
    an optical fiber for deployment into a well; and
    a measurement device optically coupled to the optical fiber, the measurement device to:
    measure characteristics in the optical fiber, wherein the measured characteristics include a profile of a characteristic of the optical fiber and a travel time of an optical signal in the optical fiber; and
    determine a length of the optical fiber deployed into the well based on the measured characteristics, wherein the travel time is measured by summing a travel time of an incident portion of the optical signal and a travel time of a back-scattered portion of the optical signal.

17. The system of claim 16, wherein the measurement device comprises a storage to store a model, and wherein the measurement device applies the measured characteristics to the model, the model to produce the length of the optical fiber based on the applied measured characteristics.

18. The system of claim 17, wherein the travel time of the optical signal comprises a sum of a first travel time of an incident optical signal transmitted by the measurement device into the optical fiber, and a second travel time of a backscattered optical signal back-scattered from a downhole marker in the optical fiber.

19. The system of claim 16, wherein the measurement device uses an optical time domain reflectometry technique to measure the characteristics.

20. The system of claim 18, wherein the optical time domain reflectometry technique comprises a Brillouin optical time domain reflectometry technique.

21. The system of claim 16, wherein the travel time of the optical signal is between a first marker at an earth surface location, and a second marker at a distal end of the optical fiber.

22. The system of claim 21, wherein the first marker comprises a series of points having temperatures different from an ambient temperature of the optical fiber.

23. An article comprising at least one storage medium containing instructions that when executed cause a measurement device to:
  transmit an optical signal into an optical cable that is deployed into a well;
  determine a travel time of the optical signal in the optical cable;
  determine a profile of a characteristic of the optical cable along the optical cable; and
  determine a length of the optical cable deployed into the well based on the determined profile and the travel time, wherein the travel time is based on summing a travel time of an incident portion of the optical signal and a travel time of a back-scattered portion of the optical signal.

* * * * *